(12) United States Patent
Takimoto et al.

(10) Patent No.: US 12,124,503 B2
(45) Date of Patent: Oct. 22, 2024

(54) SIMILAR-DEFECT SEARCH/DISPLAY SYSTEM, APPARATUS AND METHOD

(71) Applicant: KABUSHIKI KAISHA TOSHIBA, Tokyo (JP)

(72) Inventors: Takahiro Takimoto, Yokohama (JP); Kouta Nakata, Tokyo (JP); Kazunori Imoto, Kawasaki (JP); Ayana Yamamoto, Tokyo (JP); Shun Hirao, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 490 days.

(21) Appl. No.: 17/186,045

(22) Filed: Feb. 26, 2021

(65) Prior Publication Data
US 2022/0083590 A1   Mar. 17, 2022

(30) Foreign Application Priority Data
Sep. 14, 2020   (JP) ................. 2020-154108

(51) Int. Cl.
| | | |
|---|---|---|
| G06F 16/53 | (2019.01) | |
| G06F 16/55 | (2019.01) | |
| G06F 16/58 | (2019.01) | |
| G06F 16/583 | (2019.01) | |
| G06T 7/00 | (2017.01) | |

(52) U.S. Cl.
CPC .......... G06F 16/5854 (2019.01); G06F 16/53 (2019.01); G06F 16/55 (2019.01); G06F 16/5866 (2019.01); G06T 7/001 (2013.01); G06T 2207/30148 (2013.01)

(58) Field of Classification Search
None
See application file for complete search history.

(56) References Cited

U.S. PATENT DOCUMENTS

| | | | | |
|---|---|---|---|---|
| 9,401,015 B2 * | 7/2016 | Minekawa | ............. | G06T 7/001 |
| 2015/0064813 A1 * | 3/2015 | Ayotte | .................... | G06T 7/001 |
| | | | | 438/16 |

FOREIGN PATENT DOCUMENTS

| | | | | |
|---|---|---|---|---|
| JP | 2004-253445 A | | 9/2004 | |
| KR | 20100017637 A | * | 2/2010 | ......... G05B 19/0428 |
| WO | WO 2014/006807 A1 | | 1/2014 | |

OTHER PUBLICATIONS

Nakata et al., "Comprehensive Monitoring Systems for Yield Analysis Using Big Data in Semiconductor Manufacturing", Toshiba Reviews, vol. 73, No. 3, May 2018, 13 pages, (with English Machine Translation).

* cited by examiner

*Primary Examiner* — Bernard Krasnic
(74) *Attorney, Agent, or Firm* — Oblon, McClelland, Maier & Neustadt, L.L.P.

(57) ABSTRACT

According to one embodiment, system includes a determination unit, a first storage, a second storage, a search unit and a display. The determination unit determines a feature quantity of the process-targeted manufacturing data. The first storage stores cause-unidentified manufacturing data. The second storage stores cause-identified manufacturing data. The search unit searches, based on the feature quantity of the process-targeted manufacturing data, the first storage and the second storage for the cause-unidentified manufacturing data and the cause-identified manufacturing data that have a feature quantity similar to that of the process-targeted manufacturing data. The display displays the search result.

10 Claims, 10 Drawing Sheets

| Cause-identified database | Cause-unidentified database | Tendency of occurrence |
|---|---|---|
| O | O | Newly occurring |
| O | X | Not recently occurring |
| X | O | Previously ignored |
| X | X | Recurred |

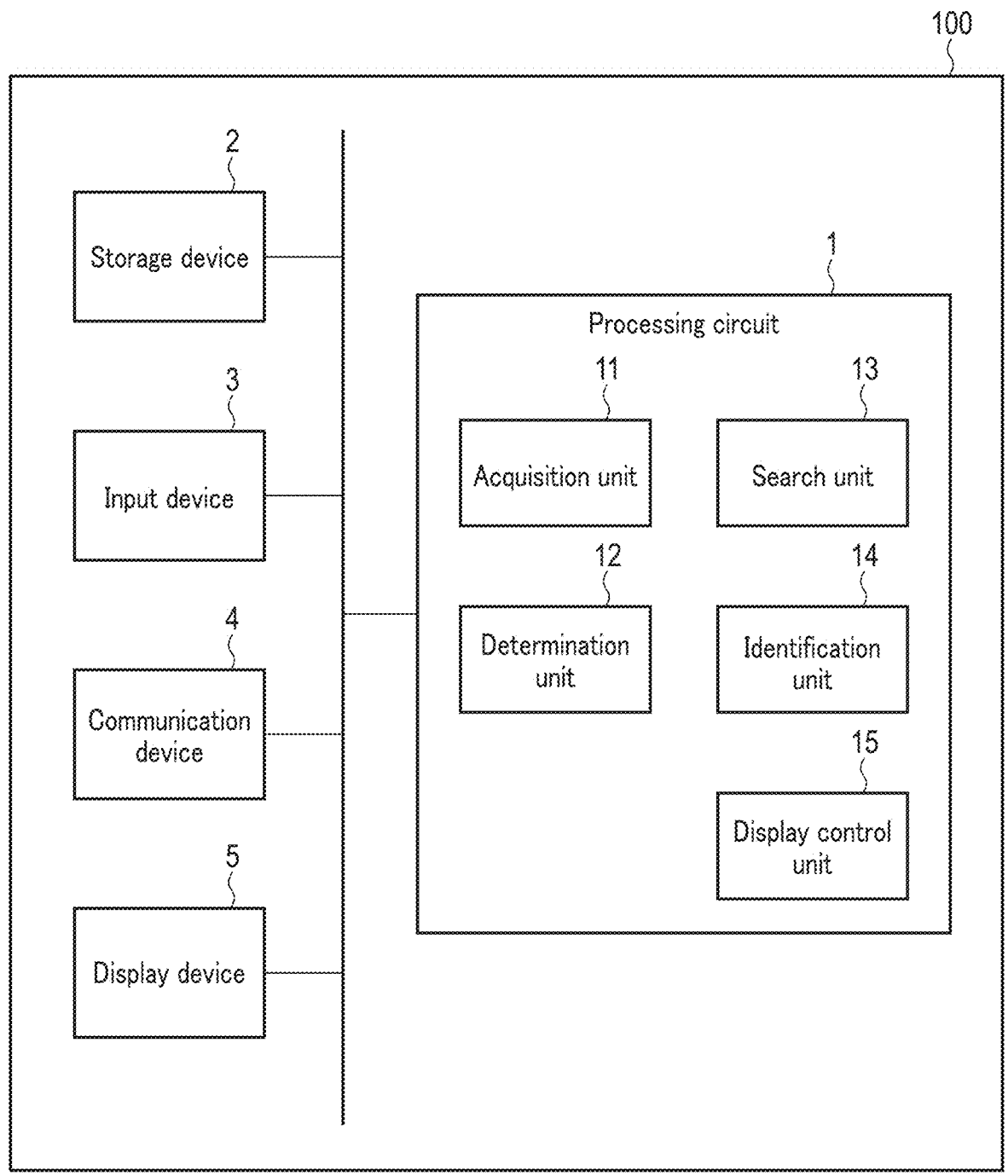
F I G. 2

Cause-unidentified data D1

| ID | Manufacturing data | Feature quantity (e.g. # of defects) | Time stamp |
|---|---|---|---|
| | | | |

Cause-identified data D2

| ID | Manufacturing data | Feature quantity (e.g. # of defects) | Time stamp | Defect cause information (e.g. cause investigation material, causing device, remedies) |
|---|---|---|---|---|
| | | | | |

| Cause-identified database | Cause-unidentified database | Tendency of occurrence |
|---|---|---|
| ○ | ○ | Newly occurring |
| ○ | × | Not recently occurring |
| × | ○ | Previously ignored |
| × | × | Recurred |

SIMILAR-DEFECT SEARCH/DISPLAY SYSTEM, APPARATUS AND METHOD

CROSS-REFERENCE TO RELATED APPLICATIONS

This application is based upon and claims the benefit of priority from Japanese Patent Application No. 2020-154108, filed Sep. 14, 2020, the entire contents of which are incorporated herein by reference.

FIELD

Embodiments described herein relate generally to a similar-defect search/display system, apparatus and method.

BACKGROUND

In recent years, a large amount of manufacturing data has been collected at manufacturing sites and used to improve product productivity. In yield analysis, which is one approach to improving productivity, the causes of defects are identified by manpower based on the results of quality inspection of the products and histories of processing steps so that measures for the identified defects can be provided to improve the yield. A large volume of manufacturing data has made a previously unfeasible advanced yield analysis feasible, with which a substantial increase in productivity has been expected. However, with too large and too complicated a volume of manufacturing data, effective information that may lead to increased productivity is becoming ever more difficult to retrieve.

A technique for presenting the frequency of occurrence of defect maps has been suggested, with which defect maps similar to a process-targeted defect map are extracted from the latest defect maps and the number of similar defect maps are plotted in time series. With this technique, however, how recent the defect was found is unknown, and therefore the user is unable to efficiently conduct a defect analysis including a yield analysis.

BRIEF DESCRIPTION OF THE DRAWINGS

FIG. 2 is a diagram showing an exemplary structure of the similar-defect search/display apparatus of FIG. 1;

FIG. 7 is a diagram showing an exemplary classification table of a tendency of occurrence used by an identification unit at step S4 of FIG. 6;

DETAILED DESCRIPTION

A similar-defect search/display system according to one embodiment includes a determination unit, a first storage unit, a second storage unit, a search unit, and a display unit. The determination unit determines a feature quantity of process-targeted manufacturing data. The first storage unit stores cause-unidentified data including manufacturing data in which a cause of a defect is not identified and a feature quantity of the manufacturing data. The second storage unit stores cause-identified data including manufacturing data in which a cause of a defect has been identified, a feature quantity of the manufacturing data, and defect cause information. The search unit searches, based on the feature quantity of the process-targeted manufacturing data, the first storage unit and the second storage unit for the cause-unidentified data and the cause-identified data, respectively, that have a feature quantity similar to the feature quantity of the process-targeted manufacturing data. The display unit displays a search result of the cause-unidentified data and a search result of the cause-identified data.

The similar-defect search/display system, apparatus and method according to the present embodiment will be explained below with reference to the drawings.

Figure 1:
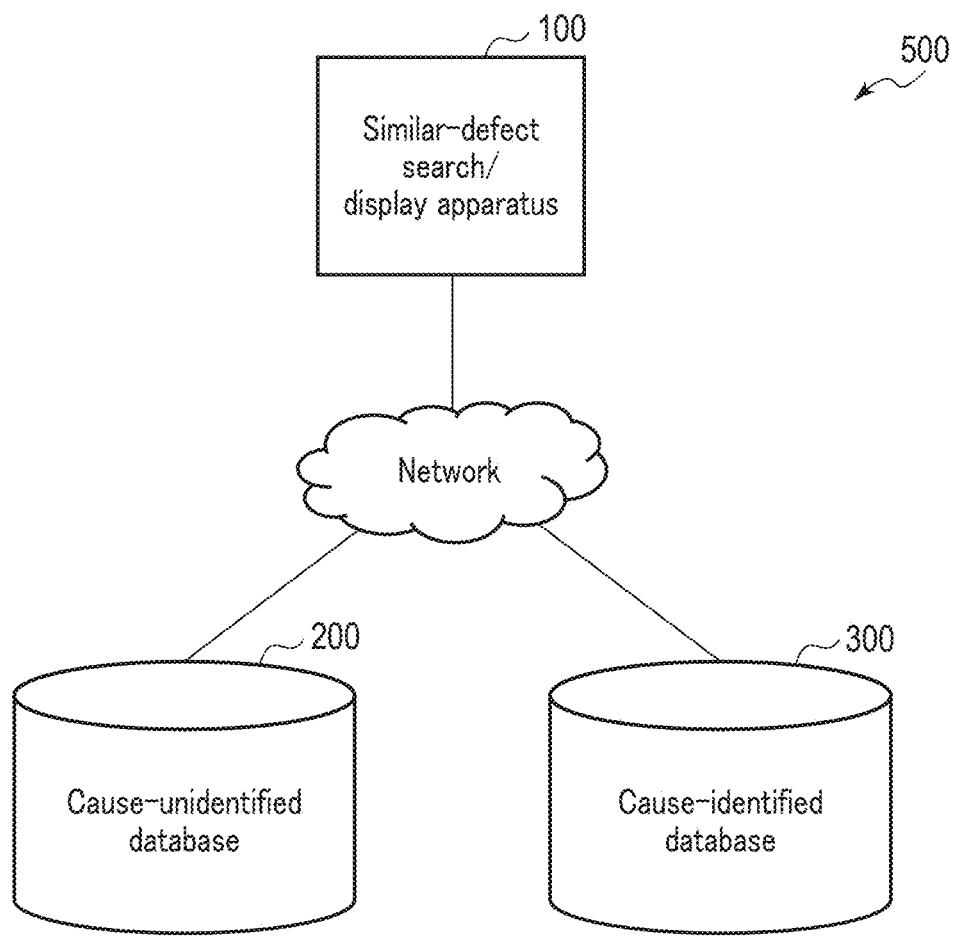
FIG. 1 is a diagram showing an exemplary structure of a similar-defect search/display system according to a present embodiment.

FIG. 1 shows an exemplary structure of a similar-defect search/display system 500 according to the present embodiment. The similar-defect search/display system 500 is a computer network system configured to search and display manufacturing data similar to process-targeted manufacturing data. The manufacturing data is product-related data that has been collected through the manufacturing process of the product. An inspection target of the manufacturing data may or may not contain a defective product. The manufacturing data relating to an inspection target containing a defective product may be referred to as "defect data".

As illustrated in FIG. 1, the similar-defect search/display system 500 includes a similar-defect search/display apparatus 100, a cause-unidentified database 200, and a cause-identified database 300. The similar-defect search/display apparatus 100 is a computer configured to search the cause-unidentified database 200 and cause-identified database 300 for manufacturing data similar to the process-targeted manufacturing data, and to display the search result. If the process-targeted manufacturing data is defect data, the similar-defect search/display apparatus 100 displays the search result of defect data similar to the process-targeted defect data.

The cause-unidentified database 200 stores data (hereinafter referred to as "cause-unidentified data") containing at least manufacturing data in which a cause of a defect is not yet determined and a feature quantity of such manufacturing data. The cause-unidentified database 200 is configured to be searchable by the similar-defect search/display apparatus 100 for a specific item of the cause-unidentified data. The cause-unidentified database 200 may also be referred to as a feature quantity database.

The cause-identified database 300 stores data (hereinafter referred to as "cause-identified data") containing at least manufacturing data in which a cause of a defect has been identified, the feature quantity of the manufacturing data, and defect cause information. The cause-identified database 300 is configured to be searchable by the similar-defect search/display apparatus 100 for a specific item of the cause-identified data. The cause-identified database 300 may also be referred to as a knowledge database.

The cause-unidentified database 200 and the cause-identified database 300 may be managed by the same computer, or by different computers.

FIG. 2 shows an exemplary structure of the similar-defect search/display apparatus 100. As illustrated in FIG. 2, the similar-defect search/display apparatus 100 includes a processing circuit 1, a storage device 2, an input device 3, a communication device 4, and a display device 5.

The processing circuit 1 includes a processor such as a central processing unit (CPU) and a memory such as a random access memory (RAM). The processing circuit 1 implements a search/display process upon manufacturing data similar to the process-targeted manufacturing data. The processing circuit 1 executes a program stored in the storage device 2 so as to realize an acquisition unit 11, a determination unit 12, a search unit 13, an identification unit 14, and a display control unit 15. The hardware implementation of the processing circuit 1 is not limited thereto. For instance, the hardware may be configured by a circuit such as an application specific integrated circuit (ASIC) that can realize the acquisition unit 11, determination unit 12, search unit 13, identification unit 14 and/or display control unit 15. The acquisition unit 11, determination unit 12, search unit 13, identification unit 14 and/or display control unit 15 may be implemented in a single integrated circuit, or separately in multiple integrated circuits.

The acquisition unit 11 acquires process-targeted manufacturing data. The manufacturing data may be data generated in relation to a product by processing devices or inspection devices during the manufacturing process, or data generated by performing various analysis processes upon such data. Furthermore, the manufacturing data may be optical images (inspection images) of an outer appearance of the product, or waveform data of the product obtained by an inspection device. Examples of the waveform data include manufacturing sound data from the manufacturing line.

The determination unit 12 determines the feature quantity of the process-targeted manufacturing data. For instance, if the manufacturing data is image data, the feature quantity may be the number or type of defects, whereas if the manufacturing data is waveform data, the feature quantity may be a spectrum of defects.

The search unit 13 searches the cause-unidentified database 200 and cause-identified database 300 for the cause-unidentified data and cause-identified data, respectively, that have a feature quantity similar to the feature quantity of the process-targeted manufacturing data.

The identification unit 14 identifies the tendency of occurrence of defects relating to the process-targeted manufacturing data in accordance with the first number of items of the cause-unidentified data found in the cause-unidentified database 200 and the second number of items of the cause-identified data found in the cause-identified database 300.

The display control unit 15 displays various types of information via the display device 5. For instance, the display control unit 15 displays the search result of the cause-unidentified data and the search result of the cause-identified data obtained by the search unit 13. The display control unit 15 may also display the tendency of occurrence identified by the identification unit 14.

The storage device 2 may be constituted by a read only memory (ROM), a hard disk drive (HDD), a solid state drive (SSD), or an integrated circuit storage device. The storage device 2 stores various calculation results obtained by the processing circuit 1, programs executed by the processing circuit 1, and the like.

The input device 3 inputs various commands from the user. As the input device 3, a keyboard, a mouse, various switches, a touch pad, or a touch panel display may be used. The output signal from the input device 3 is supplied to the processing circuit 1. The input device 3 may be a computer connected to the processing circuit 1 in a wired or wireless manner.

The communication device 4 is an interface for communicating information with external devices connected to the similar-defect search/display apparatus 100 via a network.

The display device 5 displays various types of information. For instance, the display device 5 may display the search result of the cause-unidentified data and the search result of the cause-identified data under the control of the display control unit 15. As the display device 5, a cathode-ray tube (CRT) display, a liquid crystal display, an organic electroluminescence (EL) display, a light emitting diode (LED) display, a plasma display, or any other display known in this technical field may be adopted.

The similar-defect search/display system 500 according to the present embodiment will be explained in detail below.

In the description below, the products relating to the manufacturing data are considered to be semiconductor chips manufactured in a semiconductor factory. A semiconductor factory produces several tens of types, or even several hundred types, of semiconductor products. Semiconductor products are produced on a disk, called a wafer. Then, quality inspections are conducted on individual semiconductor products, in which a dedicated computer in the semiconductor factory determines whether or not each chip sectioned from a wafer contains any defect through several tens of inspection steps or under several tens of inspection items. The dedicated computer that determines the presence/absence of a defect in the chips generates a defect map, which indicates the spatial distribution of defects in the chips of a wafer. A defect map is an example of the manufacturing data.

Figures 3, 4, 5:
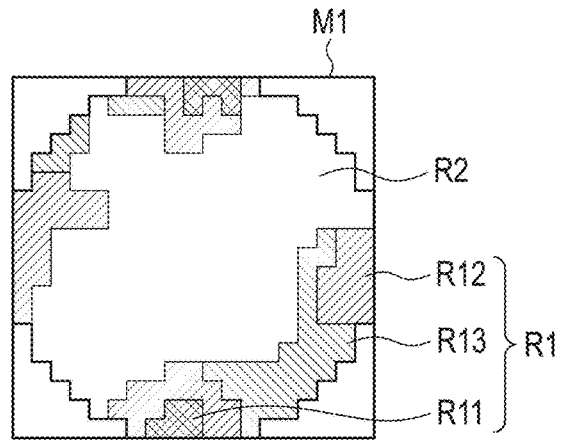
FIG. 3 is a diagram showing an exemplary defect map.
FIG. 4 is a diagram showing an exemplary structure of cause-unidentified data stored in a cause-unidentified database of FIG. 1.
FIG. 5 is a diagram showing an exemplary structure of cause-identified data stored in a cause-identified database of FIG. 1.

FIG. 3 shows an example of a defect map M1. The defect map M1 indicates a spatial distribution of defective chips on a disk-shaped wafer, as illustrated in FIG. 3. In particular, the circular region of the wafer is sectioned into multiple regions (hereinafter referred to as chip regions), which individually correspond to chips on the wafer. A flag indicating a defective product is set to regions (hereinafter referred to as defective regions) R1 of the chip regions, corresponding to the chips determined to be defective, and a flag indicating a non-defective product is set to chip regions (referred to as non-defective regions) R2 corresponding to the chips that are not determined to be defective. The defective regions R1 and non-defective regions R2 may be displayed in a visually distinguishable manner, for example by colors. The distribution of defective regions R1 on the defect map has been known to have patterns in accordance with causes of defects.

As illustrated in FIG. 3, the defective regions R1 may be further sorted in accordance with the number of defects. The number of defects corresponds to the number of inspection steps or inspection items in which each chip is determined to be defective. In the example of FIG. 3, the number of defects is expressed in three levels, "large", "medium" and "small", where a "large" flag is set to a chip region R11, a "medium" flag is set to a chip region R12, and a "small" flag is set to a chip region R13. The chip regions R11, R12 and R13 may be displayed in different colors. A numerical value indicating the number of defects, or a vector indicating defectiveness/non-defectiveness for each inspection step or inspection item is assigned as a feature quantity to each chip region. A defect map may be regarded as a heat map generated in accordance with the feature quantities of the chip regions. The manufacturing data including the generated defect maps is stored as cause-unidentified data in the cause-unidentified database 200.

The defect map M1 may be generated based on an inspection image obtained by optically photographing the outer appearance of a wafer on which chips are aligned, or may be generated based on a template in which regions are defined to correspond to these chips.

FIG. 4 shows an exemplary structure of cause-unidentified data D1 stored in the cause-unidentified database 200. The cause-unidentified data D1 includes an identifier (ID), manufacturing data, feature quantity and a time stamp, as illustrated in FIG. 4. An identifier is a symbol string constituted by a combination of characters and numerals, which can uniquely identify the cause-unidentified data D1 or the manufacturing data included in the cause-unidentified data D1. The manufacturing data may be an inspection image, a defect map, or waveform data. The feature quantity refers to the feature quantity of the manufacturing data. For instance, if the manufacturing data is an inspection image or a defect map, the feature quantity may be the number of defects or the type of defects. The number of defects is a vector indicating the presence/absence of defects in each inspection step or inspection item. The type of defects is the name or identifier of the inspection item and inspection step at which the chip is determined to be defective. The feature quantity is determined by the dedicated computer or the like. A time stamp indicates the reference time and date of the cause-unidentified data D1, such as the time and date of the manufacturing data generated, of the feature quantity determined, or of the cause-unidentified data D1 stored in the cause-unidentified database 200.

The manufacturing data stored in the cause-unidentified database 200 is subjected to a cause investigation performed by a dedicated computer or the like. The manufacturing data subjected to the cause investigation is stored as cause-identified data in the cause-identified database 300. The cause-unidentified data including the manufacturing data subjected to the cause investigation is deleted from the cause-unidentified database 200.

FIG. 5 shows an exemplary structure of cause-identified data D2 stored in the cause-identified database 300. The cause-identified data D2 includes an identifier (ID), manufacturing data, a feature quantity, a time stamp, and defect cause information, as illustrated in FIG. 5. The identifier, manufacturing data and feature quantity are the same as those in the cause-unidentified data D1. A time stamp indicates the reference time and date of the cause-identified data D2, such as the time and date of the manufacturing data generated, of the feature quantity determined, of the defect cause information obtained, or of the cause-identified data D2 stored in the cause-identified database 300. The defect cause information relates to the cause of the defect relating to the manufacturing data, and is generated through a cause investigation conducted by a dedicated computer or the like. The defect cause information may include a cause investigation material, a causing device, and remedies. A cause investigation material is an electronic file of data in which the details of the investigation results of the defect cause are described. A causing device is information of a manufacturing device presumed to be the cause of the defect. The causing device may be presumed by a dedicated computer with a method using machine learning and data mining, or may be designated by the user. Remedies are information regarding measurements that have been taken or are to be taken against the causing device for prevention or reduction of defects.

Next, the search/display process executed by the processing circuit 1 will be explained. In the following explanation of the search/display process, the manufacturing data is considered as inspection images.

Figure 6:
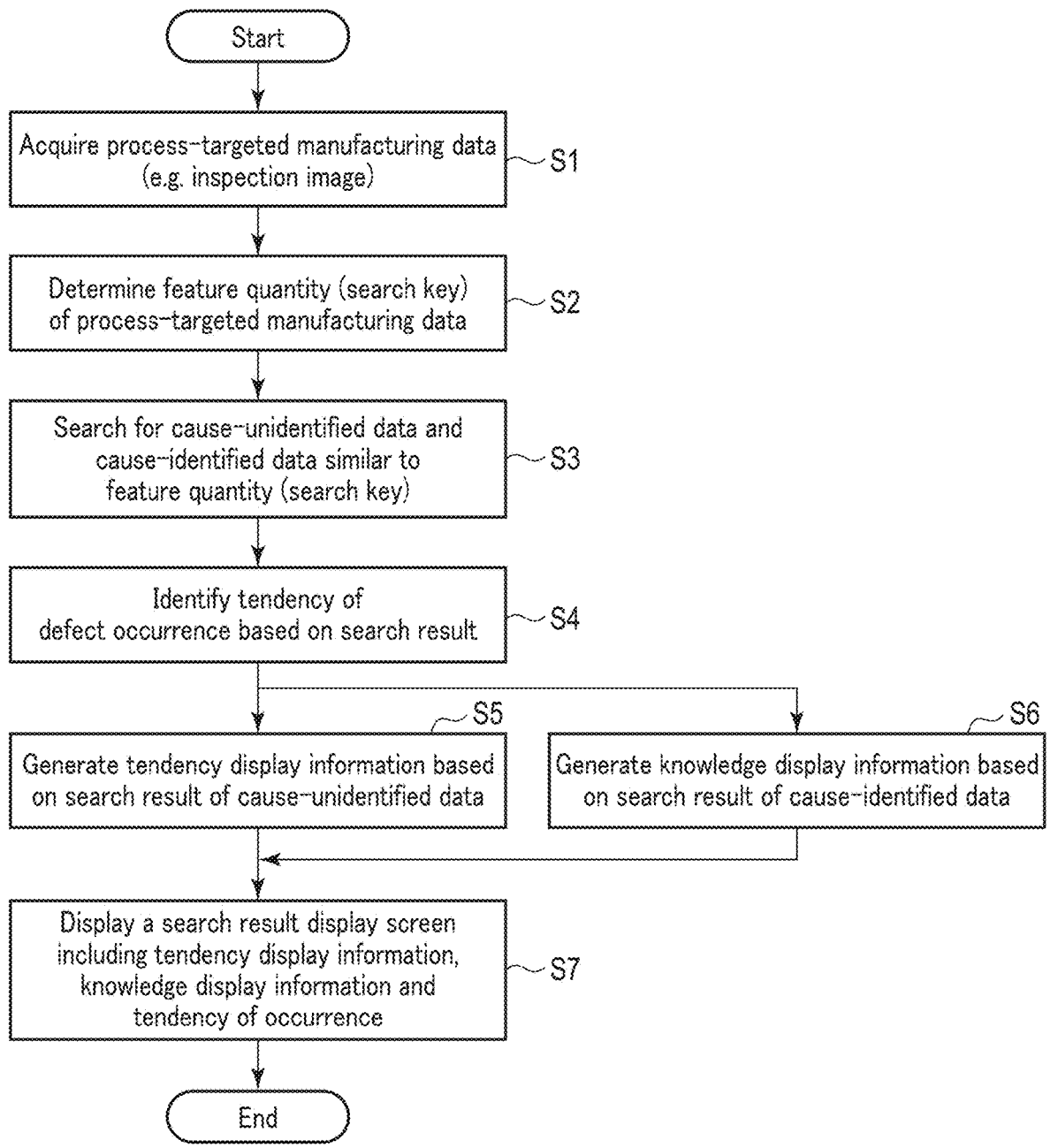
FIG. 6 is a diagram showing an exemplary flow of a search/display process at a processing circuit of FIG. 2.

FIG. 6 shows an exemplary flow of the search/display process executed by the processing circuit 1. First, the acquisition unit 11 acquires process-targeted manufacturing data (inspection image) (step S1), as illustrated in FIG. 6. At step S1, the acquisition unit 11 acquires the data from a dedicated computer of the semiconductor factory or the like, through the communication device 4. The process-targeted manufacturing data acquired at step S1 is currently stored in neither the cause-unidentified database 200 nor cause-identified database 300.

After step S1, the determination unit 12 determines the feature quantity of the process-targeted manufacturing data acquired at step S1 (step S2). At step S2, the determination unit 12 may calculate, as mentioned earlier, a vector representing the number of defects in the inspection steps or inspection items of each chip, based on the manufacturing data. The determination unit 12 may determine the type of defects in each chip instead, as mentioned earlier. A defect ratio or defect density of each chip may also serve as a feature quantity. The determined feature quantity is adopted as a search key when the search unit 13 conducts a search. The process-targeted manufacturing data is defect data containing a defect in at least one of the semiconductor chips in relation to at least one inspection step or inspection item. The present embodiment, however, is equally applicable to the manufacturing data that does not include any defect in any of the semiconductor chips.

After step S2, the search unit 13 searches for cause-unidentified data and cause-identified data having a feature quantity similar to the feature quantity determined at step S2 (step S3). At step S3, the search unit 13 searches the cause-unidentified database 200 for cause-unidentified data, and the cause-identified database 300 for cause-identified data, using the feature quantity determined at step S2 as a search key. The cause-unidentified database 200 and cause-identified database 300 respectively store the cause-unidentified data and cause-identified data obtained by the search unit 13 at step S3, previously with respect to the time point of the search.

In particular, the search unit 13 calculates a similarity between the feature quantity serving as a search key and the feature quantity of each cause-unidentified data item stored in the cause-unidentified database 200, and acquires cause-unidentified data items having a similarity that satisfies a predetermined standard level. Similarly, the search unit 13 calculates a similarity between the feature quantity serving as a search key and the feature quantity of each cause-identified data item stored in the cause-identified database 300, and acquires cause-identified data items having a similarity that satisfies a predetermined standard level. As a similarity, a cosine similarity or any other similarity may be adopted. If a cosine similarity is adopted, the threshold value may be set to 0.8 etc. so that the cause-unidentified data and cause-identified data having a similarity greater than this threshold value will be acquired as the cause-unidentified data and cause-identified data that satisfy the predetermined standard level. At step S3, the defect data similar to the process-targeted defect data is acquired from the cause-unidentified database 200 and cause-identified database 300. The defect data similar to the process-targeted defect data may be referred to as similar defect data.

Another possible method may be such that the search unit 13 acquires through clustering the cause-unidentified data and cause-identified data having a feature quantity similar to the search key. The cause-unidentified data items stored in the cause-unidentified database 200 may be sorted in advance into multiple clusters through any clustering scheme. The search unit 13 identifies a cluster that the search key belongs to, and acquires a cause-unidentified data item that belongs to the identified cluster from the cause-unidentified database 200, as a cause-unidentified data item similar to the search key. The same process can be applied to the cause-identified data. That is, the cause-identified data items stored in the cause-identified database 300 are sorted in advance into clusters through any clustering scheme, and the search unit 13 identifies a cluster that the search key belongs to, and acquires a cause-identified data item that belongs to the identified cluster from the cause-identified database 300, as a cause-identified data item similar to the search key.

After step S3, the identification unit 14 identifies the tendency of occurrence of defects, based on the search result obtained by the search unit 13 at step S3 (step S4). At step S4, the identification unit 14 identifies the tendency of occurrence of the process-targeted defect data, based on the first number of cause-unidentified data items obtained from the cause-unidentified database 200 and the second number of cause-identified data items obtained from the cause-identified database 300.

FIG. 7 shows an exemplary classification table of the tendency of occurrence. The tendency of occurrence may be classified into four statuses, namely "newly occurring", "previously ignored", "not recently occurring" and "recurring", as indicated in FIG. 7. The identification unit 14 determines one of the four statuses in accordance with a combination of whether or not the first number of items exceeds the predetermined value and whether or not the second number of items exceeds the predetermined value. The predetermined value may be freely set by the user on the input device 3, but preferably to 0 or a small integer. When the first number of items and the second number of items are both smaller than the predetermined value, the identification unit 14 determines the tendency of occurrence to be "newly occurring". The status "newly occurring" indicates that similar defect data is not present in the cause-unidentified database 200 or the cause-identified database 300, and therefore that the distribution pattern of the defective regions in the process-targeted defect data is newly found. The process-targeted defect data determined to be "newly occurring" requires an early investigation of its cause.

When the first number of items is larger than or equal to the predetermined value and the second number of items is smaller than the predetermined value, the identification unit 14 determines the tendency of occurrence to be "previously ignored". The status "previously ignored" indicates that similar defect data is present in the cause-unidentified database 200 and is not present in the cause-identified database 300, and therefore that the defect data similar to the process-targeted defect data has been ignored without being subjected to a cause investigation. The process-targeted defect data determined to be "previously ignored" requires an early investigation of its cause. If this is the case, the status "previously ignored" may be associated with a derivative status such as "with several occurrences".

When the first number of items is smaller than the predetermined value and the second number of items is larger than or equal to the predetermined value, the identification unit 14 determines the tendency of occurrence to be "not recently occurring". The status "not recently occurring" indicates that similar defect data is not present in the cause-unidentified database 200 and is present in the cause-identified database 300, and therefore that the defect data similar to the process-targeted defect data has been subjected to the cause investigation but has not recently occurred.

When the first number of items and second number of items are both larger than or equal to the predetermined value, the identification unit 14 determines the tendency of occurrence to be "recurring". The status "recurring" indicates that the similar defect data is present in both the cause-unidentified database 200 and cause-identified database 300, and therefore that the process-targeted defect data has been subjected to the cause investigation and still frequently occurs. When the status is "recurring", the cause investigation may be repeated, or feedback may be sent to the cause investigation section. If this is the case, the status "recurring" may be associated with derivative statuses such as "now being investigated" and "feedback sent".

After step S4, the display control unit 15 generates tendency display information based on the search result of the cause-unidentified data obtained by the search unit 13 at step S3 (step S5). The tendency display information is display information generated based on the search result of the cause-unidentified data obtained by the search unit 13 at step S3. The tendency display information may be a graph representing in time sequence the frequency of occurrence of similar defect data stored in the cause-unidentified database 200. The tendency display information is an example of the search result of the cause-unidentified data.

After step S4, the display control unit 15 generates knowledge display information based on the search result of the cause-identified data obtained by the search unit 13 at step S3 (step S6). The knowledge display information is display information generated based on the search result of the cause-identified data obtained by the search unit 13 at step S3. The knowledge display information may be defect cause information associated with the similar defect data stored in the cause-identified database 300. The knowledge display information is an example of the search result of the cause-identified data.

After steps S5 and S6, the display control unit 15 displays a search result display screen including the tendency display information generated at step S5, the knowledge display information generated at step S6, and the tendency of occurrence determined at step S4 (step S7). The search result display screen is output to the display device 5 by the display control unit 15. The content displayed on the search result display screen may be modified in accordance with the status of the tendency of occurrence.

Figure 8:
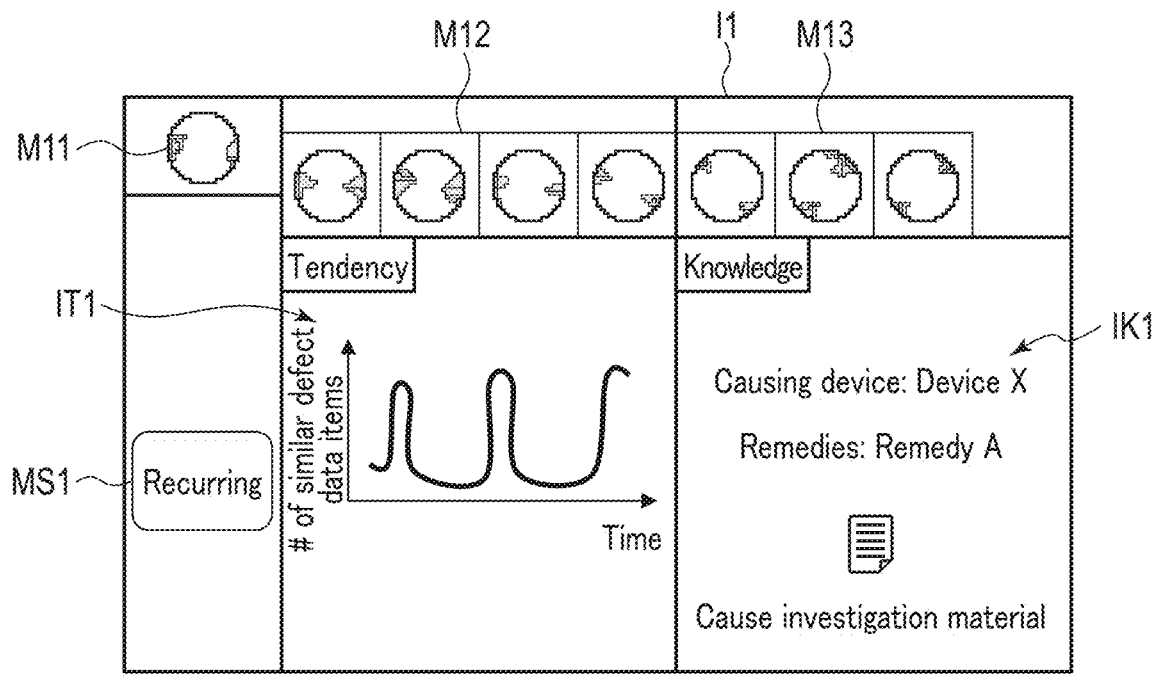
FIG. 8 is a diagram showing an exemplary search result display screen displayed at step S7 of FIG. 6, in relation to a tendency of occurrence of "recurring"

FIG. 8 shows an example of a search result display screen I1 relating to the tendency of occurrence "recurring". For instance, a defect map M11 relating to the process-targeted defect data, a "recurring" symbol MS1, defect maps M12 of the cause-unidentified data, tendency display information IT1, defect maps M13 of the cause-identified data, and knowledge display information IK1 may be displayed on the search result display screen I1, as illustrated in FIG. 8. The defect maps M12 of the cause-unidentified data, tendency display information IT1, defect maps M13 of the cause-identified data, and knowledge display information IK1 are examples of search results.

The defect map M11 is preferably generated based on the feature quantity associated with the process-targeted manufacturing data (inspection image) obtained at step S1. In particular, the display control unit 15 assigns a feature quantity to each of the chip regions of the defect map template and creates a visualization using colors that correspond to the feature quantities, thereby generating and displaying a defect map M11. Together with the defect map M11, the ID and time stamp associated with this defect map M11 may also be displayed. The symbol MS1 "recurring" indicates that the tendency of occurrence of defects similar to the process-targeted defect data is determined at step S4 to be "recurring". With merely a glance at the symbol MS1, the user can understand that defects similar to the process-targeted defect data occur frequently.

The defect maps M12 of the cause-unidentified data, which are found from the cause-unidentified database 200 at step S3, relate to the cause-unidentified data. The defect maps M12 are individually displayed in the predetermined display region on the search result display screen I1. If there are too many defect maps M12 to fit in the display region, a slider may be provided in the display region, or the maps may be displayed in a different window so that all the defect maps M12 can be displayed. Together with the defect map M12, the ID and time stamp associated with this defect map may also be displayed. If no defect map M12 is stored in the cause-unidentified database 200, the display control unit 15 may assign a feature quantity to each of the chip regions of the defect map template for each item of the cause-unidentified data, and may create a visualization using colors that correspond to different feature quantities, thereby generating and displaying a defect map M12.

The tendency display information IT1 is a graph indicating the change in the number of similar defect data items over time. In particular, in the graph of the tendency display information IT1, its vertical axis represents the number of similar defects, and its horizontal axis represents time. For instance, the display control unit 15 refers to the time stamp of the cause-unidentified data found from the cause-unidentified database 200, and plots the number of cause-unidentified data (similar defect data) items found, per predetermine time unit, for example per day, per week or per month. Based on this plotting, the display control unit 15 calculates a tendency curve representing the time-series curve of the number of cause-unidentified data items (similar defect data items), and plots the calculated tendency curve onto a graph. By observing the tendency display information IT1, the frequency of recurrence of the similar defect data can be diagrammatically understood.

The defect maps M13 of the cause-identified data, which are found from the cause-identified database 300 at step S3, relate to the cause-identified data. The defect maps M13 are individually displayed in the predetermined display region on the search result display screen. If there are too many defect maps M13 to fit in the display region, a slider may be provided in the display region, or the maps may be displayed in a different window so that all the defect maps M13 can be displayed. Together with the defect maps M13, the IDs and time stamps associated with these defect maps may also be displayed. If no defect map M13 is stored in the cause-identified database 300, the display control unit 15 may assign a feature quantity to each of the chip regions of the defect map template for each item of the cause-identified data, and may create a visualization using colors that correspond to different feature quantities, thereby generating and displaying a defect map M13.

The knowledge display information IK1 is defect cause information contained in the found cause-identified data. Examples of the knowledge display information IK1 may include a causing device, remedies, and a cause investigation material. The character information representing the name of a "device X" may be displayed as a causing device, the character information representing "remedy A" may be displayed as a remedy, and an icon in which an access link to a document file of the cause investigation material is embedded may be displayed as a cause investigation material. The knowledge display information IK1 to be displayed may be the defect cause information associated with one of the displayed defect maps M13 designated by the user on the input device 3, or may be the defect cause information associated with the defect map having the highest similarity among the displayed defect maps M13. The defect cause information may be displayed for each defect map M13. With the knowledge display information IK1 displayed, the causing device, remedies, and cause investigation material can be presented to the user, which expedites the defect analysis (yield analysis) in an efficient manner.

Figure 9:
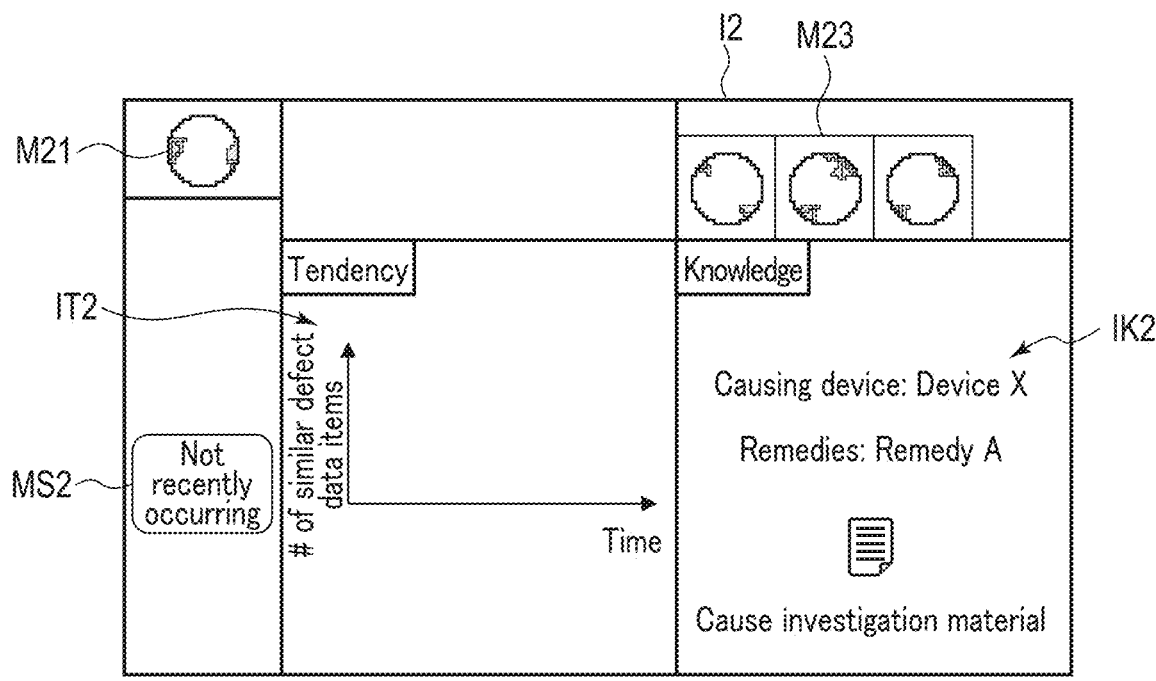
FIG. 9 is a diagram showing an exemplary search result display screen displayed at step S7 of FIG. 6, in relation to a tendency of occurrence of "not recently occurring"

FIG. 9 shows an example of a search result display screen 12 relating to the tendency of occurrence "not recently occurring". For instance, a defect map M21 relating to the process-targeted defect data, a "not recently occurring" symbol MS2, tendency display information IT2, and a defect map M23 of the cause-identified data and knowledge display information IK2 are displayed on the search result display screen 12, as illustrated in FIG. 9. The defect map M21 is the same as the defect map M11 of FIG. 8. The "not recently occurring" symbol MS2 indicates that the tendency of occurrence of defects similar to the process-targeted manufacturing data is determined at step S4 to be "not recently occurring". With merely a glance at the symbol MS2, the user can understand that the process-targeted defect data has not recently occurred.

When the tendency of occurrence is "not recently occurring", cause-unidentified data will not be found, and therefore no tendency curve will be plotted in the graph of the tendency display information IT2. No defect map of the cause-unidentified data will also be displayed. With no tendency curve and no defect map of the cause-unidentified data displayed, the user understands that no cause-unidentified data similar to the process-targeted defect data is present. By setting the threshold value to be used for sorting of the tendency of occurrence to two or larger, or by expanding the range of similarity, the cause-unidentified data may be found even when the tendency of occurrence is "not recently occurring". If this is the case, in a similar manner to FIG. 8, a tendency curve relating to the found cause-unidentified data may be plotted on the graph of the tendency display information IT2, or a defect map relating to the found cause-unidentified data may be displayed.

The defect maps M23 and knowledge display information IK2 of the cause-identified data are the same as the defect maps M13 and knowledge display information IK1 of the cause-identified data of FIG. 8. With the knowledge display information IK2 displayed, the causing device, remedies, and cause investigation material can be presented to the user, which expedites the defect analysis (yield analysis) in an efficient manner.

Figure 10:
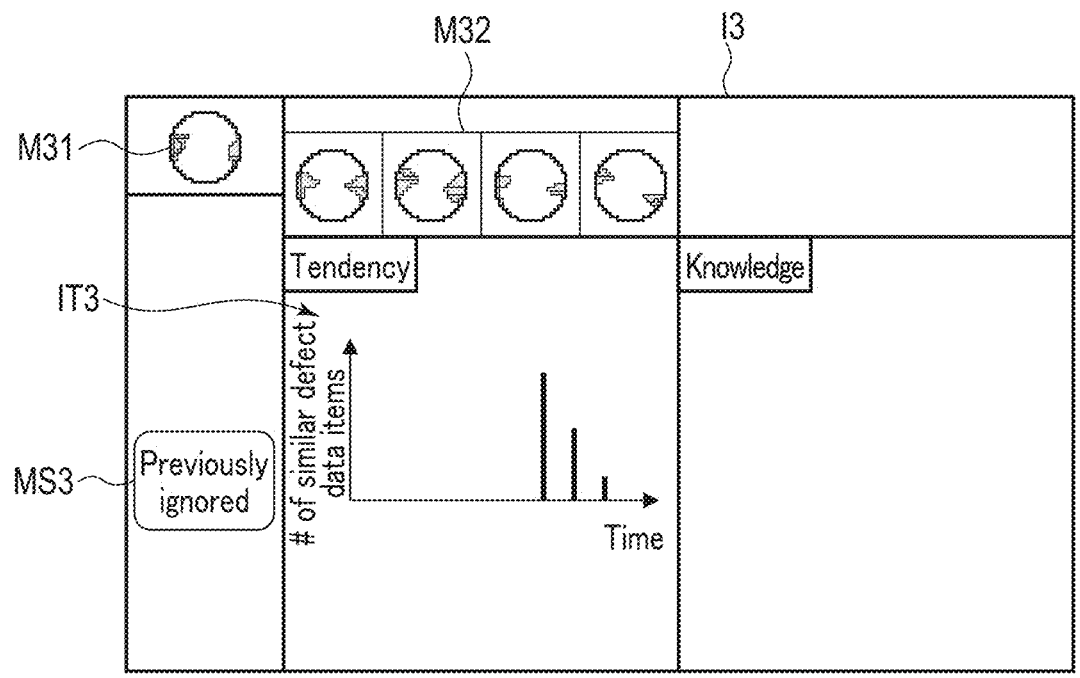
FIG. 10 is a diagram showing an exemplary search result display screen displayed at step S7 of FIG. 6, in relation to a tendency of occurrence of "previously ignored"

FIG. 10 shows an example of a search result display screen 13 relating to the tendency of occurrence "previously ignored". For instance, a defect map M31 relating to the process-targeted defect data, a "previously ignored" symbol MS3, tendency display information IT3, and the defect maps M32 of the cause-unidentified data are displayed on the search result display screen 13, as illustrated in FIG. 10. The defect map M31 is the same as the defect map M11 of FIG. 8. The "previously ignored" symbol MS3 indicates that the tendency of occurrence of defects similar to the process-targeted manufacturing data is determined at step S4 to be "previously ignored". With merely a glance at the symbol MS3, the user can understand that a cause investigation of defect data similar to the process-targeted defect data has been ignored.

The defect maps M32 and tendency display information IT3 of the cause-unidentified data are the same as the defect maps M12 and tendency display information IT1 of the cause-unidentified data of FIG. 8. When the tendency of occurrence is "previously ignored", it is assumed that more recent cause-unidentified data will be found with reference to the time point of the search, in comparison with the tendency of occurrence being "recurring". If this is the case, the display control unit 15 may increase the scale of the time axis for the tendency display information IT3.

When the tendency of occurrence is "not recently occurring", no cause-identified data will be found, and therefore no knowledge display information IK3 nor defect map of the cause-identified data will be displayed. By setting the threshold value to be used for sorting of the tendency of occurrence to two or larger, or by expanding the range of similarity, the cause-unidentified data may be found even when the tendency of occurrence is "not recently occurring". If this is the case, cause investigation information relating to the found cause-identified data may be displayed, or defect maps relating to the found cause-identified data may be displayed, in a manner similar to FIG. 8.

Figure 11:
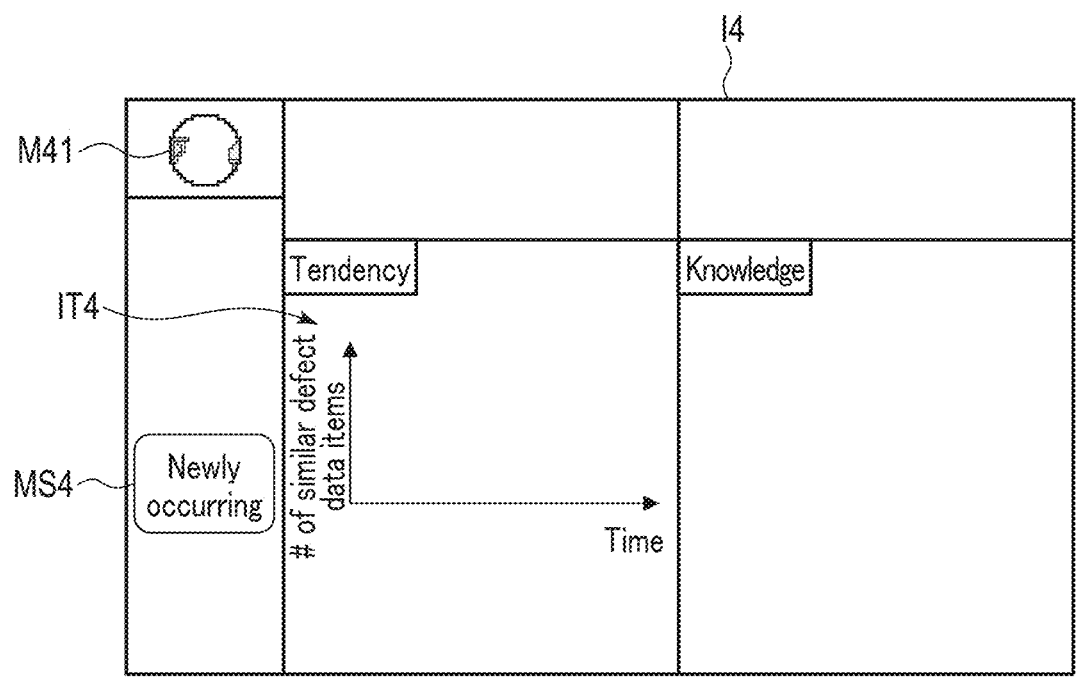
FIG. 11 is a diagram showing an exemplary search result display screen displayed at step S7 of FIG. 6, in relation to a tendency of occurrence of "newly occurring"

FIG. 11 shows an example of a search result display screen 14 relating to the tendency of occurrence "newly occurring". For instance, a defect map M41 relating to the process-targeted manufacturing data and a "newly occurring" symbol MS4 are displayed on the search result display screen 14, as illustrated in FIG. 11. The defect map M41 is the same as the defect map M11 of FIG. 8. The "newly occurring" symbol MS4 indicates that the tendency of occurrence of defects similar to the process-targeted defect data is determined at step S4 to be "newly occurring". With merely a glance at the symbol MS4, the user can understand that the process-targeted defect data is newly occurring.

When the tendency of occurrence is "newly occurring", no cause-unidentified data will be found, and therefore no tendency curve will be plotted in the graph of the tendency display information IT4. No defect map of the cause-unidentified data will also be displayed. By setting the threshold value to be used for sorting of the tendency of occurrence to two or larger, or by expanding the range of similarity, the cause-unidentified data may be found even when the tendency of occurrence is "newly occurring". If this is the case, in a similar manner to FIG. 8, a tendency curve relating to the found cause-unidentified data may be plotted on the graph of the tendency display information IT4, or a defect map relating to the found cause-unidentified data may be displayed.

When the tendency of occurrence is "newly occurring", no cause-identified data will be found, and therefore no knowledge display information nor defect map of the cause-identified data will be displayed. By setting the threshold value to be used for sorting of the tendency of occurrence to two or larger, or by expanding the range of similarity, the cause-unidentified data may be found even when the tendency of occurrence is "newly occurring". If this is the case, cause investigation information relating to the found cause-identified data may be displayed, or defect maps relating to the found cause-identified data may be displayed, in a manner similar to FIG. 8.

The search result display screens I1 to 14 of step S7 are introduced as examples, and a variety of modifications may be made thereto. For instance, the defect maps M11 to M14 of the process-targeted manufacturing data may not need to be displayed, and defect maps of the cause-unidentified data and defect maps of the cause-identified data may also not need to be displayed. In order to emphasize the "previously ignored" symbol MS3 and "newly occurring" symbol MS4, the display control unit 15 may display these symbols in a color different from that of the "recurring" symbol MS1 and "not recently occurring" symbol MS2. The defect maps of the cause-unidentified data and cause-identified data may be arranged in descending order of similarity, or in descending or ascending order of time stamps. On each of the defect maps M11 to M14, M12, M13, M23 and M32, the corresponding identifier, and a character or numeral indicating the similarity, may be described.

With the above operations, a similar-defect search/display process of the processing circuit 1 is completed.

The above similar-defect search/display process has been introduced merely as an example, and a variety of modifications may be made thereto.

In the above explanation, an inspection image of a wafer containing defective chips is adopted for the process-targeted manufacturing data. The present embodiment is not limited thereto. An inspection image in which the process-targeted manufacturing data contains no defective chip may be adopted. If this is the case, the number of defects determined at step S2 is a zero vector. When the number of defects shows a zero vector, the display control unit 15 may display a message that the process-targeted manufacturing data does not contain defect data.

In the above explanation, the identification unit 14 is configured to determine the tendency of occurrence at step S4. The present embodiment is not limited thereto, and the tendency of occurrence may not always need to be determined. If the determination is not made, a symbol representing the tendency of occurrence will not be displayed. The user, however, may be able to estimate the tendency of occurrence through an observation of the tendency display information and knowledge display information. In addition, the tendency of occurrence is sorted into four statuses, but the number of statuses is not limited thereto. Any number larger than or equal to two can be adopted.

In the above explanation, the display control unit 15 is configured to individually display defect maps of the cause-unidentified data and the cause-identified data on the search result display screen. The display control unit 15, however, may display an average map of the defect maps of the cause-unidentified data. If this is the case, the display control unit 15 calculates an average value of the feature quantities for each of the chip regions of the defect maps of two or more found items of the cause-unidentified data, and assigns the calculated average value to the corresponding chip region to generate an average map. The display control unit

15 may also display an average map of the defect maps with regard to the cause-identified data. This will facilitate the observation of similar defect maps. An average map is an example of average data of the cause-unidentified data and/or average data of the cause-identified data.

In the above explanation, the display control unit 15 is configured to display the tendency display information on the left side of the search result display screen, and the knowledge display information on the right side. The display control unit 15, however, is not limited thereto. The tendency display information may be displayed on the right side of the search result display screen, and the knowledge display information may be displayed on the left side. Alternatively, the display control unit 15 may display the tendency display information on the upper side of the search result display screen, and the knowledge display information on the lower side.

The display control unit 15 of the above explanation may be configured to display the defect maps of the cause-unidentified data and cause-identified data as the search result of the cause-unidentified data and cause-identified data, in a manner such that the cause-unidentified data is separate from the cause-identified data.

Figure 12:
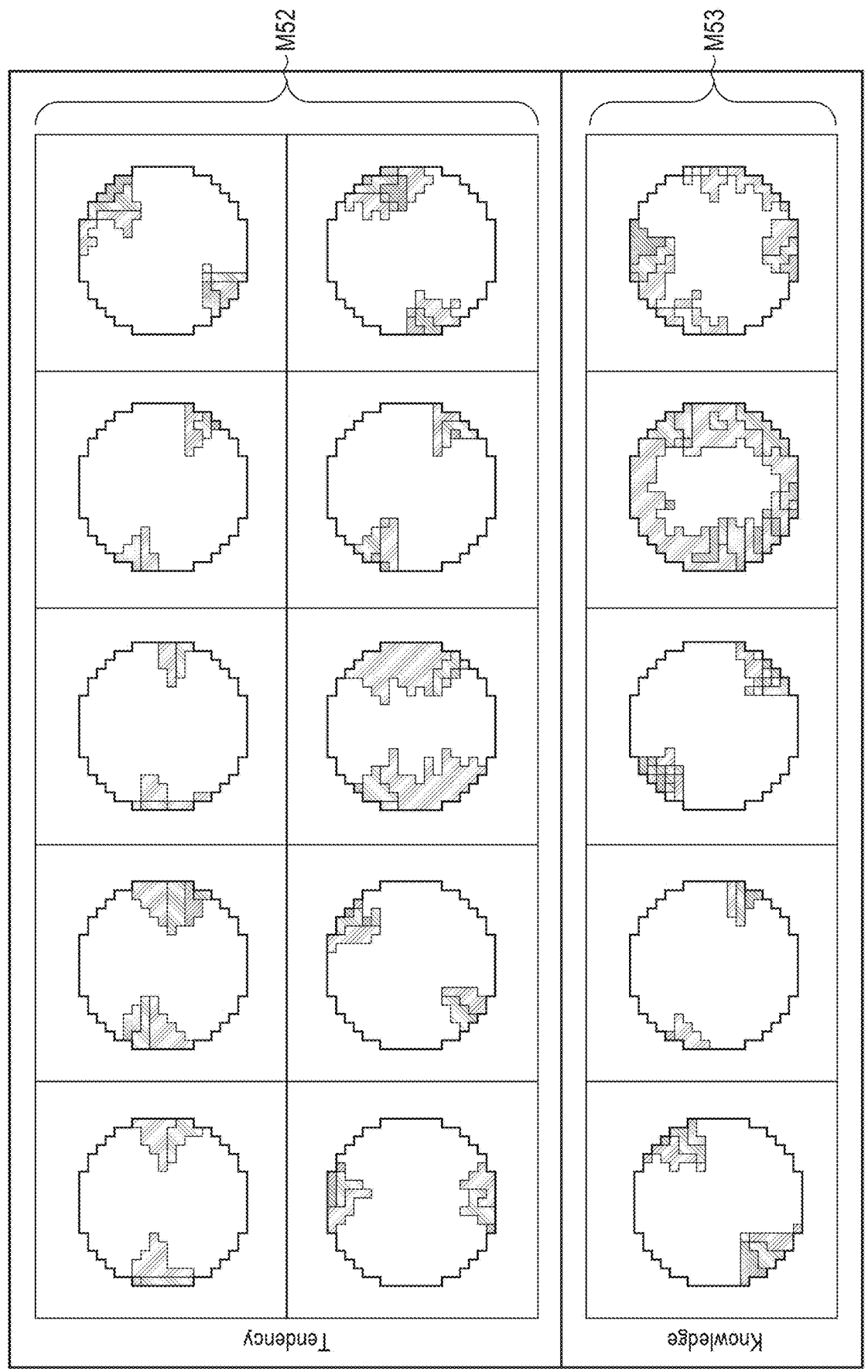
FIG. 12 is a diagram showing an example of displaying a list of defect maps of cause-unidentified data and cause-identified data.

FIG. 12 shows an example of displaying a list of defect maps of the cause-unidentified data and cause-identified data. The display control unit 15 individually arranges and displays the defect maps M52 of the cause-unidentified data on the upper side, and the defect maps M53 of the cause-identified data on the lower side, as illustrated in FIG. 12. The defect maps M52 of the cause-unidentified data and defect maps M53 of the cause-identified data may be arranged in descending or ascending order of similarity in each screen region, or in descending or ascending order of time stamps (reference times). The user may designate descending or ascending order on the input device 3. The defect map M52 of the cause-unidentified data may be arranged on the lower side, and the defect map M53 of the cause-identified data may be arranged on the upper side.

Figure 13:
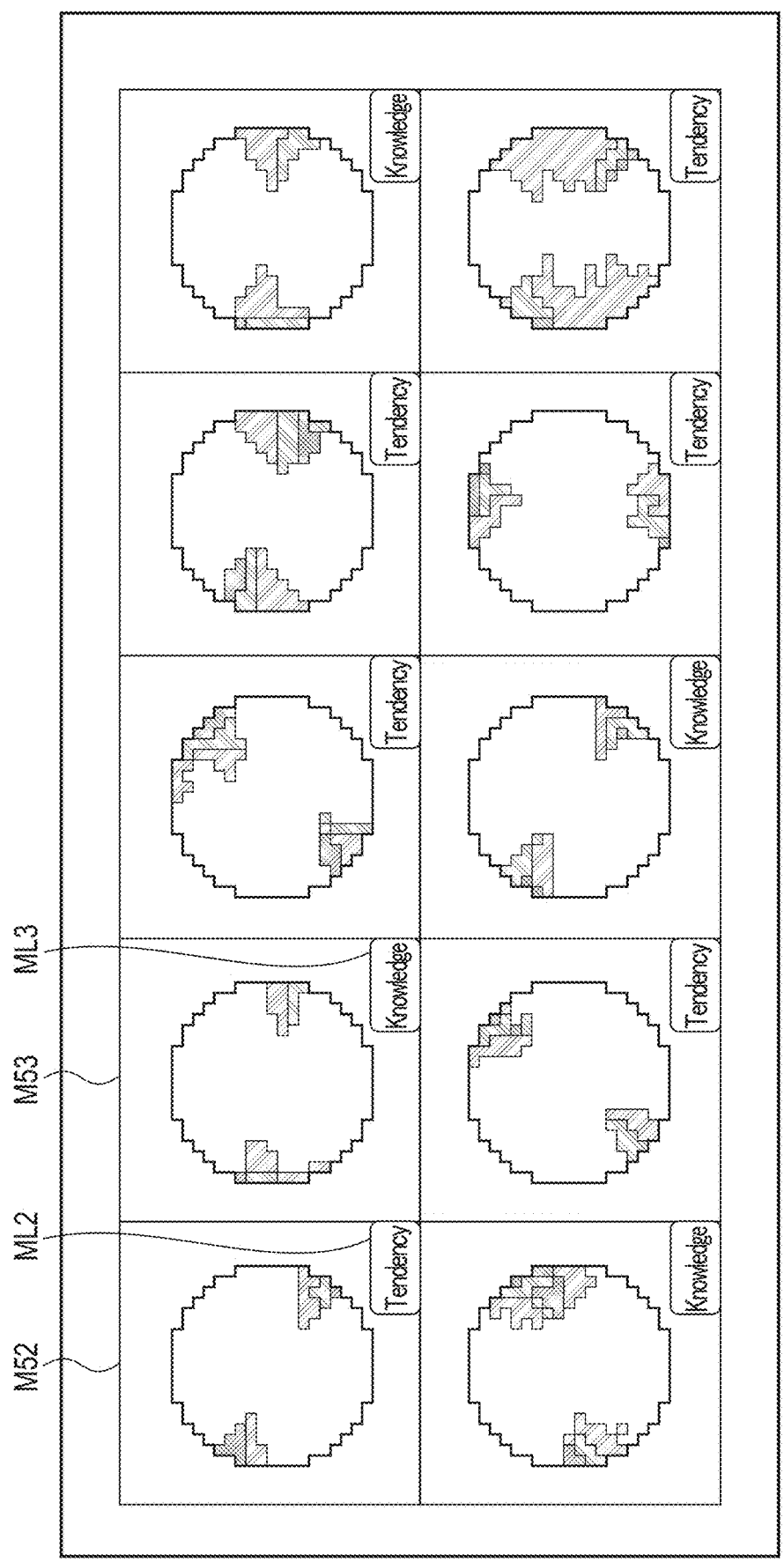
FIG. 13 is a diagram showing another example of displaying a list of defect maps of cause-unidentified data and cause-identified data.

FIG. 13 shows another example of displaying a list of defect maps of the cause-unidentified data and cause-identified data. The display control unit 15 individually arranges and displays the defect maps M52 of the cause-unidentified data and the defect maps M53 of the cause-identified data on the same screen region, as illustrated in FIG. 13. A label ML2 such as "tendency" may be attached to the defect maps M52 of the cause-unidentified data to represent the cause-unidentified data, and a label ML3 such as "knowledge" may be attached to the defect maps M53 of the cause-identified data to represent the cause-identified data. The defect maps M52 of the cause-unidentified data and the defect maps M53 of the cause-identified data may be arranged in descending or ascending order of similarity, or in descending or ascending order of time stamp. The user may designate descending or ascending order on the input device 3.

Figure 14:
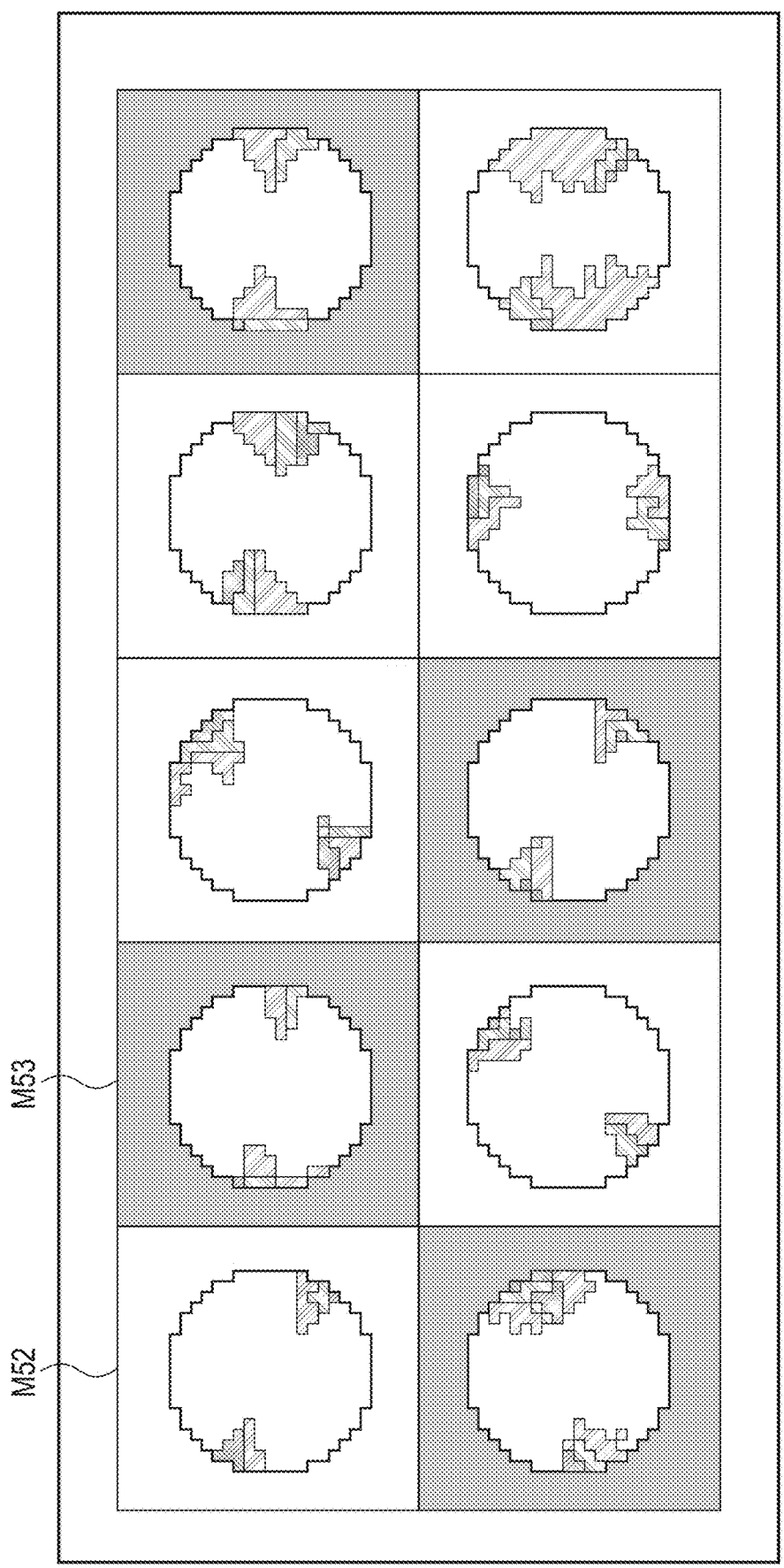
FIG. 14 is a diagram showing still another example of displaying a list of defect maps of cause-unidentified data and cause-identified data.

FIG. 14 shows still another example of displaying a list of defect maps of the cause-unidentified data and cause-identified data. The display control unit 15 individually arranges and displays, as illustrated in FIG. 14, the defect maps M52 of the cause-unidentified data and the defect maps M53 of the cause-identified data on the same screen region in a manner similar to FIG. 13. For the background of the defect maps M52 of the cause-unidentified data, blue may be adopted to represent the cause-unidentified data, and for the background of the defect maps M53 of the cause-identified data, red may be adopted to represent the cause-identified data. The defect maps M52 of the cause-unidentified data and the defect maps M53 of the cause-identified data may be arranged in descending or ascending order of similarity, or in descending or ascending order of time stamps in a manner similar to FIG. 13. The user may designate descending or ascending order on the input device 3.

In the above explanation, the determination unit 12 is assumed to deal with a single item of process-targeted manufacturing data. If there are multiple items of process-targeted manufacturing data, the operations at steps S1 to S7 of FIG. 6 simply need to be conducted upon each item of the manufacturing data.

The similar-defect search/display process may be efficiently conducted using summary data of the multiple items of manufacturing data. The process may be conducted in the procedure indicated below. The number of items of the manufacturing data may vary, and is assumed to range from several tens to several hundreds. The number of items of the manufacturing data may be smaller or larger than this range.

First, the acquisition unit 11 acquires multiple items of manufacturing data as process-targeted manufacturing data. The determination unit 12 sorts the acquired items of manufacturing data based on the feature quantity into different clusters (hereinafter referred to as "focus groups"). The determination unit 12 may conduct clustering in accordance with the similarity or distance of the feature quantities to sort the items of manufacturing data into focus groups. Each focus group has an ID assigned. Next, the determination unit 12 determines a single feature quantity (hereinafter referred to as "representative feature quantity") based on the items of manufacturing data that belong to the different focus groups. For instance, the determination unit 12 may determine multiple feature quantities corresponding to multiple items of manufacturing data that belong to the focus groups, and set the average value of the feature quantities as a representative feature quantity. Alternatively, the determination unit 12 may calculate the average data of the items of manufacturing data that belong to the focus groups, and determine the feature quantity of the calculated average data as the representative feature quantity. The determination unit 12 determines representative feature quantities respectively corresponding to the focus groups.

Next, the search unit 13 searches the cause unidentified database 200 for cause-unidentified data, and the cause-identified database 300 for cause-identified data, using the representative feature quantity as a search key for each of the focus groups. The identification unit 14 determines the tendency of occurrence for each of the focus groups, while the display control unit 15 generates tendency display information and knowledge display information, and displays a search result including tendency display information, knowledge display information, and tendency of occurrence. In this manner, the similar-defect search/display process for multiple items of manufacturing data can be efficiently conducted.

According to the present embodiment, the similar-defect search/display system 500 includes a determination unit 12, a cause-unidentified database 200, a cause-identified database 300, a search unit 13, and a display control unit 15. The determination unit 12 determines the feature quantity of the process-targeted manufacturing data. The cause-unidentified database 200 stores cause-unidentified data, which contains manufacturing data in which a cause of a defect is not yet identified and a feature quantity of the manufacturing data. The cause-identified database 300 stores cause-identified data that contains manufacturing data in which a cause of a defect has been identified, the feature quantity of the manufacturing data, and defect cause information. The search unit 13 searches the cause-unidentified database 200 and cause-identified database 300 for the cause-unidentified data and cause-identified data, respectively, that have a feature quantity similar to the feature quantity of the process-targeted manufacturing data. For instance, the display control unit 15 displays the search result of the cause-unidentified data and the search result of the cause-identified data.

With the above structure, the similar-defect search/display system 500 according to the present embodiment includes a cause-unidentified database 200 that stores manufacturing data in which a cause of a defect is not yet identified and a cause-identified database 300 that stores manufacturing data in which a cause of a defect has been identified, and displays the search results of the cause-unidentified data and the cause-identified data that are similar to the process-targeted defect data. By referring to the search results of the cause-unidentified data and the cause-identified data, the user can ascertain the tendency of defect occurrence such as whether a defect relating to the process-targeted defect data is a newly occurring defect or a previously occurring (recurring) defect. In other words, the similar-defect search/display system 500 is capable of presenting the tendency of defect occurrence at a high granularity. As a result, the user can take remedies in accordance with the tendency of defect occurrence. For instance, if a defect is a newly occurring one, the user needs to send the product to a defective product analysis. On the other hand, if a defect is a recurring one, the causing device has already been identified. The user therefore only needs to go and check this causing device to solve the problem. Thus, unnecessary tasks or trouble can be prevented from arising due to unascertained remedies, the cause of a defect can be swiftly and accurately identified, and therefore a suitable remedy can be taken. Furthermore, the turnaround time (TAT) required for the defect analysis such as yield analysis can be reduced.

According to the present embodiment, the functions of the units or a program that causes a computer to realize such functions may be stored in a non-transitory computer-readable storage medium.

With the above structure according to the present embodiment, the efficiency of the defect analysis can be greatly improved.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A similar-defect search/display system comprising:
processing circuitry configured to
determine a feature quantity of process-targeted manufacturing data;
store, in a first memory, cause-unidentified data including manufacturing data in which a cause of a defect is not identified and a feature quantity of the manufacturing data;
store, in a second-memory, cause-identified data including manufacturing data in which a cause of a defect has been identified, a feature quantity of the manufacturing data, and defect cause information;
search, based on the feature quantity of the process-targeted manufacturing data, the first memory and the second memory for the cause-unidentified data and the cause-identified data, respectively, that have a feature quantity similar to the feature quantity of the process-targeted manufacturing data; and
display, on a display device, a search result of the cause-unidentified data and a search result of the cause-identified data,
wherein the processing circuitry is configured to:
identify a tendency of occurrence of a defect relating to the process-targeted manufacturing data in accordance with a first number of items of the cause-unidentified data found in the first memory and a second number of items of the cause-identified data found in the second memory, and
further display, on the display device, the tendency of occurrence.

2. The system according to claim 1, wherein
the tendency of occurrence includes at least one status of newly occurring, recurring, not recently occurring, and previously ignored.

3. The system according to claim 2, wherein the processing circuitry is further configured to determine that:
the tendency of occurrence is of the status of being newly occurring when the first number of items and the second number of items are both smaller than a predetermined value;
the tendency of occurrence is of the status of being previously ignored when the first number of items is larger than or equal to the predetermined value and the second number of items is smaller than the predetermined value;
the tendency of occurrence is of the status of being not recently occurring when the first number of items is smaller than the predetermined value and the second number of items is larger than or equal to the predetermined value; and
the tendency of occurrence is of the status of being recurring when the first number of items and the second number of items are both larger than or equal to the predetermined value.

4. The system according to claim 2, wherein
the processing circuitry displays, on the display device, the cause-unidentified data found and/or the cause-identified data found, together with a label indicating the status of the tendency of occurrence.

5. The system according to claim 1, wherein
the processing circuitry displays, on the display device, the cause-unidentified data found in the first memory and/or the cause-identified data found in the second memory.

6. The system according to claim 1, wherein
the processing circuitry individually displays, on the display device, the cause-unidentified data found in the first memory and/or the cause-identified data found in the second memory.

7. The system according to claim 1, wherein
the process-targeted manufacturing data includes at least one of an inspection image of an outer appearance of a product, a defect map indicating a spatial distribution of the defect in the product, and waveform data of the product obtained by an investigation device.

8. The system according to claim 1, wherein
the process-targeted manufacturing data is an optical image of an outer appearance of a disk on which a plurality of semiconductor chips are arranged, at least one of the semiconductor chips includes a defect in relation to at least one inspection step or inspection item.

9. A similar-defect search/display apparatus comprising:
processing circuitry configured to
- determine a feature quantity of process-targeted manufacturing data;
- based on the feature quantity of the process-targeted manufacturing data, search a first memory that stores cause-unidentified data and a second memory that stores cause-identified data for the cause-unidentified data and the cause-identified data, respectively, that have a feature quantity similar to the feature quantity of the process-targeted manufacturing data, the cause-unidentified data including manufacturing data in which a cause of a defect is not identified and a feature quantity of the manufacturing data, the cause-identified data including manufacturing data in which a cause of a defect is identified, a feature quantity of the manufacturing data and defect cause information; and
- display, on a display device, a search result of the cause-unidentified data and a search result of the cause-identified data, wherein the processing circuitry is configured to:
identify a tendency of occurrence of a defect relating to the process-targeted manufacturing data in accordance with a first number of items of the cause-unidentified data found in the first memory and a second number of items of the cause-identified data found in the second memory, and
further display, on the display device, the tendency of occurrence.

10. A similar-defect search/display method, implemented by processing circuitry of a similar-defect search/display system, comprising:
- determining a feature quantity of process-targeted manufacturing data;
- searching, based on the feature quantity of the process-targeted manufacturing data, a first memory that stores cause-unidentified data and a second memory that stores cause-identified data for the cause-unidentified data and the cause-identified data, respectively, that have a feature quantity similar to the feature quantity of the process-targeted manufacturing data, the cause-unidentified data including manufacturing data in which a cause of a defect is not identified and a feature quantity of the manufacturing data, and the cause-identified data including manufacturing data in which a cause of a defect is identified, a feature quantity of the manufacturing data and defect cause information; and
- displaying, on a display device, a search result of the cause-unidentified data and a search result of the cause-identified data, wherein the method further includes:
identifying a tendency of occurrence of a defect relating to the process-targeted manufacturing data in accordance with a first number of items of the cause-unidentified data found in the first memory and a second number of items of the cause-identified data found in the second memory, and
further displaying, on the display device, the tendency of occurrence.

* * * * *